June 26, 1923.
R. P. SEARLE
1,459,752
SPECIFIC GRAVITY INDICATOR
Filed Feb. 2, 1921
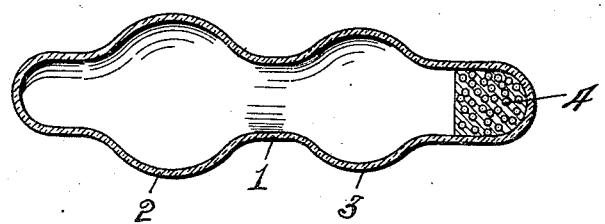
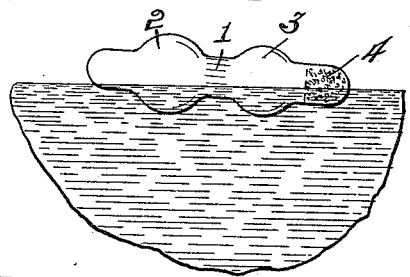
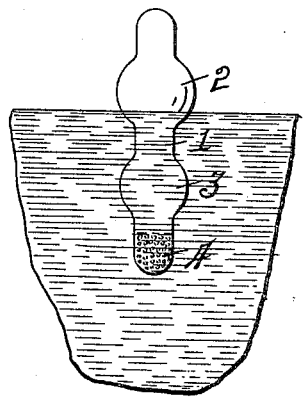
INVENTOR
Robinson P. Searle,
By Owen Owen & Crampton.
His attys.

Patented June 26, 1923.

1,459,752

UNITED STATES PATENT OFFICE.

ROBINSON P. SEARLE, OF TOLEDO, OHIO.

SPECIFIC-GRAVITY INDICATOR.

Application filed February 2, 1921. Serial No. 441,749.

*To all whom it may concern:*

Be it known that I, ROBINSON P. SEARLE, a citizen of the United States, and a resident of Toledo, in the county of Lucas and State of Ohio, have invented a certain new and useful Specific-Gravity Indicator; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

This invention relates to measuring instruments, and particularly to those of the class adapted for measuring the viscosity or specific gravity of liquids.

In the use of motors, particularly those of the internal combustion type, it is necessary or advisable to change the lubricating oil in the crank case when it becomes worn out or has become so thinned by the fuel oil, such as gasoline or kerosene, as not to be of the required minimum specific gravity for proper running or lubricating conditions.

The object of my invention is the provision of a simple specific gravity measuring instrument particularly designed for use by motorists, which by its position in a liquid will indicate whether the liquid is above or below a predetermined specific gravity condition, and if used in the crank case oil of a motor will quickly indicate if the oil should be replaced with new oil.

The invention is fully described in the following specification, and while, in its boarder aspect, it is capable of embodiment in numerous forms, a preferred embodiment thereof is illustrated in the accompanying drawings, in which,—

Figure 1 is a longitudinal section of a member embodying the invention. Fig. 2 is a reduced view thereof showing it floating in reclining position on a liquid, the specific gravity of which is sufficient to sustain the weighted end of the member, and Fig. 3 is a view of the member in upright floating position in a liquid indicating that the liquid is below a predetermined specific gravity condition.

The invention comprises an elongated float or buoyant member having one end weighted to such an extent relative to the other end that when the specific gravity of the liquid in which the member is placed is above a predetermined point, the member will float in horizontal or reclining position in the liquid and when the specific gravity is below such point, the weighted or less buoyant end of the member will swing down in the liquid so that the member will assume an upright position or at least stand at an angle to a horizontal, thereby indicating that the specific gravity of the liquid is below the required point.

In the present embodiment of the invention, the buoyant member comprises a hollow glass stem 1 sealed or rendered air-tight at its ends and throughout its length and having two bulbous enlargements 2 and 3 formed in longitudinally spaced relation thereon to normally cause a horizontal floating of the members in a liquid in which placed. The stem at one end is weighted a predetermined extent relative to the other end, as by securing shot or other weighted matter 4 therein. When the specific gravity of a liquid in which the member is placed is sufficient to sustain the weight of the heavy or weighted end of the member, the member will remain in horizontal or reclining position, as indicated in Fig. 2, and when the specific gravity has dropped below the predetermined weight sustaining point, the weighted end of the member will swing downward in the liquid either to original position or to a point where its gravity action will be sustained by the buoyancy of the member as a whole, as indicated in Fig. 3. It is evident that the weight at the sinking end of the member is gauged to suit the conditions required.

It is preferable to have the stem at the upper end of the member extend above the bulb 2 to serve as a finger-piece to facilitate placing the article into or removing it from a liquid to be tested.

I wish it understood that the invention is not limited to any specific construction or form, as it is capable of numerous changes and embodiments without departing from the spirit of the claims.

Having thus described my invention, what I claim as new and desire to secure by Letters Patent, is,—

1. A device of the class described for testing the specific gravity of a liquid which should be maintained at a desired standard, said device comprising an elongated buoyant member having one end weighted relative to the other, the weight being such that the weighted end will not sink if the liquid has a specific gravity corresponding to that of the desired standard, the member then floating in a horizontal position but taking various angular positions in liquids having lesser specific gravity than that of the standard.

2. A device of the class described for ascertaining whether a liquid has or has not a predetermined specific gravity condition, said device comprising a stem having longitudinally spaced bulbous portions thereon and so weighted at one end that the instrument will assume an upright floating position in a liquid if below said predetermined specific gravity condition or will assume a reclining floating position on the liquid if the specific gravity thereof is above a predetermined point.

In testimony whereof, I have hereunto signed my name to this specification.

ROBINSON P. SEARLE.